Sept. 19, 1944.  I. JEPSON  2,358,515
HOSE NOZZLE
Filed Oct. 3, 1942
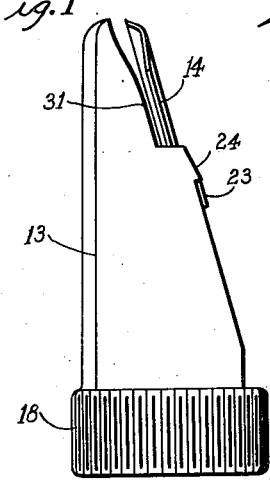
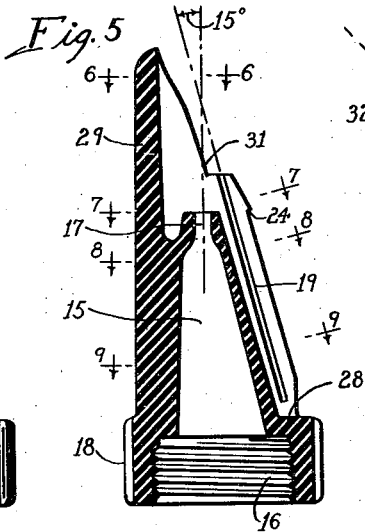
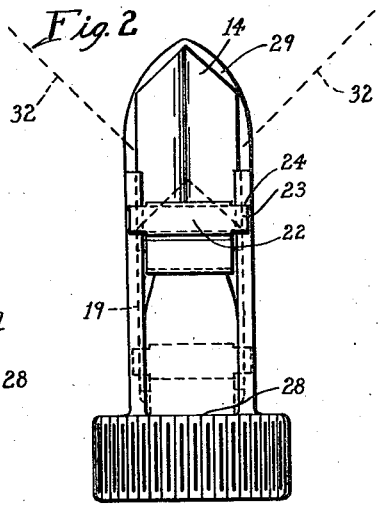
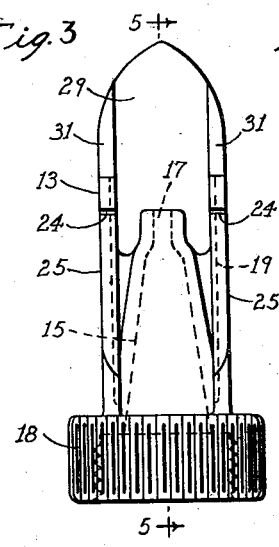
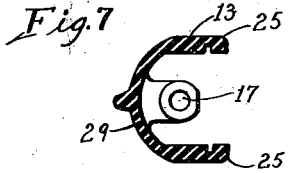
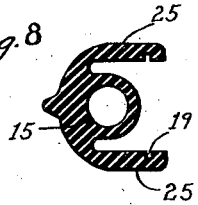
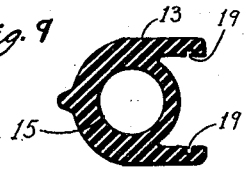
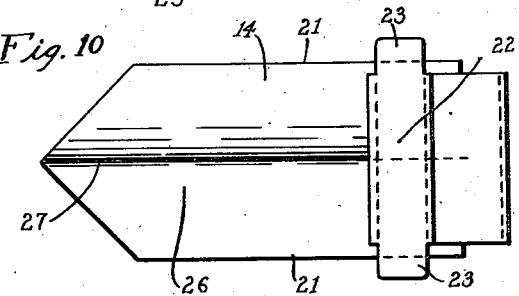
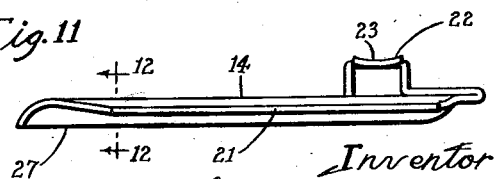
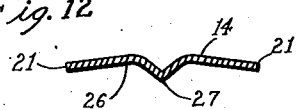
Inventor
Ivar Jepson
By McCanna, Wintercorn & Morsbach
Attys.

Patented Sept. 19, 1944

2,358,515

UNITED STATES PATENT OFFICE 2,358,515

HOSE NOZZLE

Ivar Jepson, Chicago, Ill., assignor to Chicago Flexible Shaft Company, Chicago, Ill., a corporation of Illinois Application October 3, 1942, Serial No. 460,609

8 Claims. (Cl. 299—130)

This invention relates to hose nozzles of the type adapted for sprinkling lawns, gardens and the like.

Hose nozzles of this type in common use are objectionable because of the packed joint for the rotatably adjustable nozzle which invariably develops leaks at the joint and causes the water to drip rearward of the discharge orifice. This prior type of hose nozzle also involves a screw thread adjustment which is slow to operate and not infrequently sticks, making it hard to adjust.

The present invention aims to provide an improved hose nozzle which will overcome the above noted objections to the common type of hoze nozzle.

Another object of the invention is to provide a hose nozzle of such improved construction that it will be quick and easy to adjust or regulate from a solid jet to a fine fan shaped spray. One of the features of my improved construction is the provision of a thumb tip regulator which is quickly and smoothly adjustable and which avoids leaking and dripping.

Another object is the provision of a hose nozzle of simple construction designed so that the nozzle body may be formed by molded plastic material or by die casting so as to require no machining operations, and a regulator slide of stamped construction mounted to slide on ways integral with the nozzle body, making a construction economical to manufacture.

Other objects and attendant advantages will be appreciated by those skilled in this art as the invention becomes better understood by reference to the following description when considered in connection with the accompanying drawing in which—

Figure 1 is a side elevation of a hose nozzle embodying my invention;

Fig. 2 is a front elevation thereof;

Fig. 3 is a front elevation of the nozzle body with the regulator slide removed;

Fig. 4 is an end view of the nozzle body, looking at the hose connection end;

Fig. 5 is a section taken on the section line 4—4 of Fig. 3;

Figs. 6, 7, 8, and 9 are cross sections taken substantially on the section lines 6—6, 7—7, 8—8, and 9—9, respectively of Fig. 5;

Fig. 10 is a top face view of the regulator slide plate, on an enlarged scale;

Fig. 11 is a side elevation thereof; and

Fig. 12 is a cross section taken on the section line 12—12 of Fig. 11.

Referring to the drawing it will be observed that my improved hose nozzle comprises essentially two parts, a nozzle body and a regulator slide or plate designated generally by reference numerals 13 and 14, respectively. The nozzle body is preferably of molded plastic material, or it may be formed by die casting, to provide a water passage 15 having at one end an internally threaded opening or socket 16 for a standard hose connection and at the opposite end a discharge orifice 17 of restricted diameter in comparison with the cross section of the passage 15. This passage 15 preferably is tapered so as to gradually increase the velocity of the water flow so that it will discharge from the orifice 17 in a jet or stream of high velocity. The end portion 18 of the body is enlarged and knurled on its periphery to provide a convenient hand grasp for turning the body when connecting and disconnecting it with respect to the usual threaded hose connection. The nozzle body is further formed to provide opposed parallel grooves or ways 19 in a plane at an acute angle with respect to the center line of the discharge orifice, preferably at about 15° with respect thereto as indicated in Fig. 5. The regulator slide 14 is shaped to provide parallel opposite sides 21 and fit in the ways 19 so as to be slidable lengthwise thereon. The slide may be suitably formed to provide a thumb or finger grip for convenience in operating the slide and, in the present instance, I have bent the rear end of the slide forwardly upon itself, thence upwardly, thence forwardly, and thence downwardly, as best shown in Fig. 11, to provide a raised portion 22. This provides an upstanding thumb grip and the face or a portion thereof may be corrugated or otherwise formed as a further aid in gripping the slide when moving it from one position to another. Stop lugs 23 formed from the slide portion 22 are adapted to engage stops 24 formed on the top portion of the nozzle body, thus limiting the outward extension or projection of the slide. In the preferred embodiment the nozzle body is shaped to provide parallel side walls 25 in which the ways 19 are formed and which serve to support the regulator slide with proper clearance with respect to the jet delivery. This construction also promotes economy in manufacture. The slide is preferably shaped in cross section to provide a slightly dished face 26 having at its center a projection V-shaped ridge 27, as shown in Fig. 12, the cross section of which may extend substantially the full length of the slide. The outer end of the slide is tapered to a point. The slide may be moved from the retracted position shown in dotted lines in Fig. 2 in which it abuts against the shoulder 28 on the nozzle body 2, to the extended position shown in full lines, or to any intermediate position. The slide is shaped so as to have yielding frictional engagement with the ways so that it will be held stationary in any position to which it is set. The nozzle body is further shaped to provide a wall 29 extending from the nozzle end parallel with the nozzle orifice and spaced therefrom at the side opposite from the regulator slide. In the preferred form the side walls 25 are extended outwardly so as to merge with the wall 29 but these side walls are shaped at 31 to provide a spray discharge opening in cooperative relation with the slide. The wall 29 also is shaped to conform substantially with the shape of the slide in the extended position thereof, but slightly larger than the slide (as shown in Fig. 2), so as to constitute a protecting wall to prevent injury to the slide in its extended position.

In operation it will be manifest that when the slide is retracted the water will be discharged in a full jet or stream determined by the shape of the discharge orifice 17 and the passage 15. By projecting the slide forwardly its V-shaped center ridge will centrally intercept the discharging stream so as to deflect the stream into a fan shaped delivery of a size and spread dependent on the extent of the projection. When the slide is in its fully projected position it will serve to spread the stream into a fine fan shaped spray over an area designated approximately by the dotted lines 32 in Fig. 2. The construction is such that this spray will be substantially uniformly distributed throughout this area. It will be observed that the fan spray is discharged through the slit-like opening between the plate and the extended end of the nozzle body, but the shape of the spray delivery is determined only by the deflecting action of the face of the slide against the jet delivered from the discharge orifice. It will be further observed that the construction is such that when the hose is held in the hand with the nozzle resting across the forefinger and with the thumb on top of the slide, the hose and nozzle may be conveniently and firmly held in the one hand and at the same time the thumb is free to quickly and smoothly move the slide forward or backward to instantly obtain the desired jet or spray delivery. It will be further observed that there is no joint or break in the flow of the water from the time it enters the nozzle body until it is discharged through the jet orifice, with the result that there is no cause for leaking or dripping of water, also that the slide constitutes a deflector which may be instantly set to obtain any desired degree of deflection of the stream within the capacity of the construction.

While I have shown a particular embodiment of my invention, it will be understood that I do not wish to be limited thereto since many modifications may be made, and I therefore contemplate by the appended claims to cover any such modifications as fall within the true spirit and scope of my invention.

I claim:

1. A hose nozzle comprising a nozzle body having a passage, a restricted discharge orifice at the outlet end of said passage, a deflector plate slidable on the body in a plane in angular relation to the jet discharge of said orifice and movable in said plane between a retracted position in which the plate is substantially withdrawn from the jet to an extended position in which the face of the plate intercepts the jet and deflects it in a fan shaped spray, and a wall on said nozzle body extended from the region of said orifice in the direction of the jet discharge and at one side of said jet and positioned to provide with the deflector plate a narrow opening through which said fan spray is discharged.

2. A hose nozzle comprising: a one-piece nozzle body having a longitudinal tapered passage, a discharge orifice at the narrow end of said passage, laterally spaced parallel walls at opposite sides of said passage providing an elongated slide opening between the walls, and a wall extension beyond said discharge orifice at the side of the nozzle body opposite from said walls shaped to provide one side of a fan spray opening; and a deflector plate mounted to slide lengthwise upon and between said spaced walls in a plane in acute angle relation to the longitudinal center axis of the discharge orifice and accessible at said slide opening between said walls for thumb or finger manipulation for lengthwise movement of the plate, the outer end portion of the plate being shaped to be projected by said length-wise movement across the jet or stream discharge from said orifice to deflect the same into a fan shaped spray of varying degree of spread according to the extent of said projection.

3. A hose nozzle comprising: a nozzle body formed to provide passage having a restricted discharge orifice, and opposed parallel guideways in a plane angular with respect to the axis of the jet discharged from said orifice; and a deflector plate supported at its opposite edges on said guideways for movement thereon to different positions in which the face of the extended end portion of the plate is adapted to intercept said jet and deflect it to fan shape, the deflector plate having stop members overhanging the guideway portions of the nozzle body and the nozzle body having stop portions adapted to be engaged by the stops on the plate to limit its outer movement.

4. A hose nozzle comprising a nozzle body having a passage terminated in a restricted discharge orifice, a deflector plate mounted on the nozzle body for movement in a plane at an acute angle with relation to the longitudinal center axis of the discharge orifice into and out of an extended position in which it intercepts the jet stream discharge from said orifice and deflects the same into a fan shape, and a V-shaped ridge projecting from the face of the plate extending longitudinally thereof and located so that the point of the ridge intercepts the center of the jet delivered from the discharge orifice, the nozzle body being extended beyond its discharge orifice to provide a protecting wall for the deflector plate in its extended position and being shaped to provide with the plate when the latter is projected, a narrow opening for the fan shaped spray.

5. A hose nozzle comprising a nozzle body having a passage terminated in a restricted discharge orifice, a deflector plate mounted on the nozzle body for movement in a plane at an acute angle with relation to the longitudinal center axis of the discharge orifice into and out of an extended position in which it intercepts the jet or stream discharge from said orifice and deflects the same into a fan shape, and a V-shaped ridge projecting from the face of the plate extending longitudinally thereof and located so that the point of the ridge intercepts the center of the jet delivered from the discharge orifice, the nozzle body being formed to provide spaced parallel walls at opposite sides of the tapered passage and the inner side of said walls having ways for the sliding support of the deflector plate.

6. A hose nozzle having a body member provided with a longitudinally tapered passage and having an orifice at the narrow end for discharging the water in a jet stream lengthwise from the passage, a guideway at one side of said passage in a plane in acute angle relation to the longitudinal center axis of said discharge orifice, a deflector plate supported on said guideway and movable lengthwise thereon by thumb manipulation when the hose nozzle is held in the hand, the plate being arranged so that its face is moved into the jet stream to a greater or lesser degree by said manipulation, the face of the plate being shaped to deflect the stream from a jet to a fan shaped spray according to the position of the plate, and the body member having a wall extending from the region of said discharge orifice in the direction of the jet discharge at one side of said jet and positioned to provide with the deflector plate a narrow opening through which said fan spray is discharged.

7. A nozzle of the class described having a nozzle body provided with a passage terminating in an orifice for discharging in a jet stream lengthwise from said passage, a deflector plate mounted on the nozzle body for adjustment in a plane in angular relation to the jet stream and movable in said plane between a retracted position in which the plate is substantially withdrawn from the jet stream to an extended position in which the face of the plate intercepts the jet stream and deflects it in a fan shaped spray, and a wall integral with the nozzle body located at the side of the jet stream opposite from the deflector plate and providing with the deflector plate a narrow opening through which said fan spray is discharged.

8. A hose nozzle as set forth in claim 7, in which the outer end portion of the deflector plate is tapered lengthwise from its side edges to a central point and in which the extended wall of the body member is shaped to substantially conform with the tapered outer end of the deflector plate.

IVAR JEPSON.